Jan. 26, 1965 A. H. PITCHFORD 3,167,259
METHOD AND APPARATUS FOR GRINDING AND/OR BLENDING
Filed March 8, 1961 5 Sheets-Sheet 1
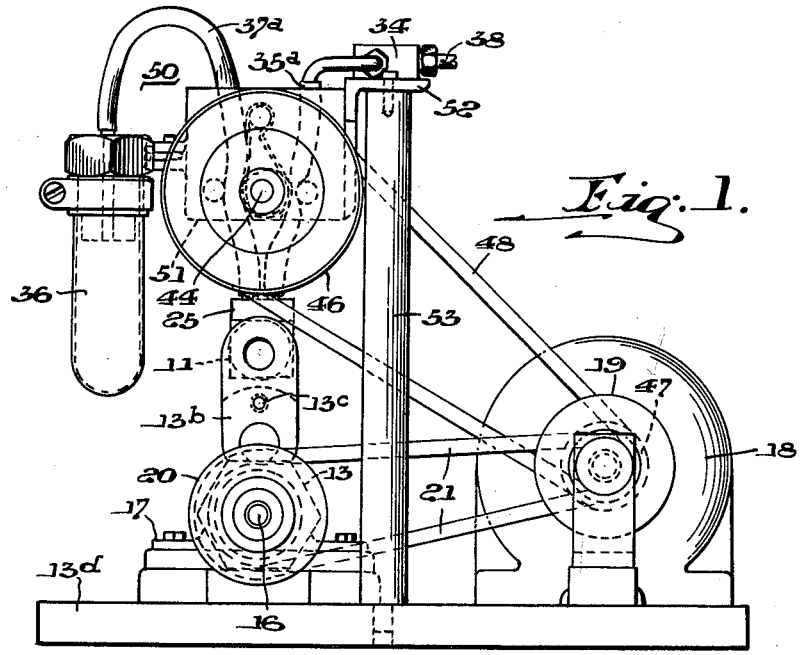
*Fig. 1.*
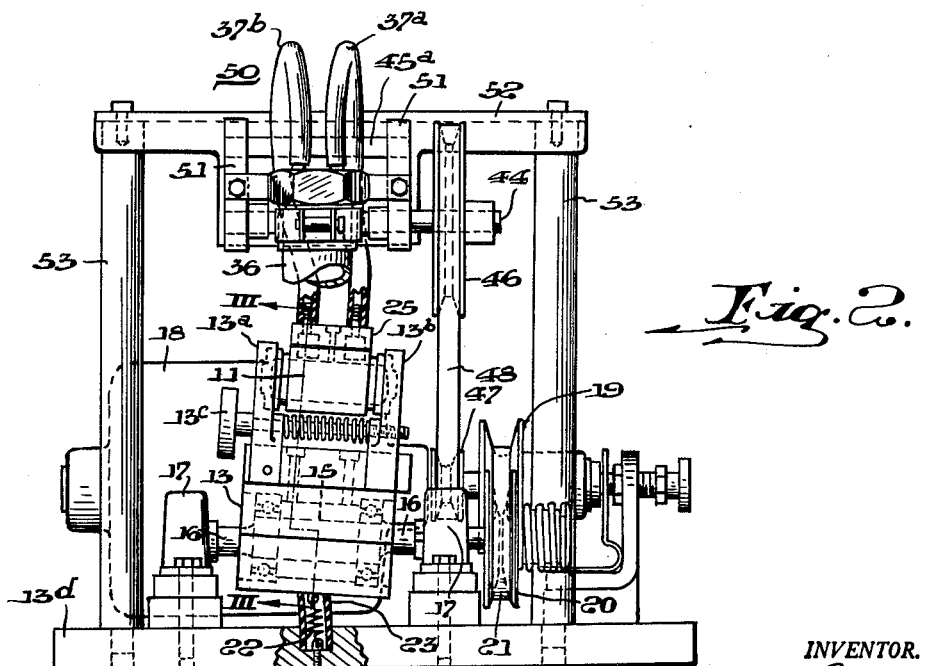
*Fig. 2.*
INVENTOR.
ARTHUR H. PITCHFORD
BY 
his ATTORNEY

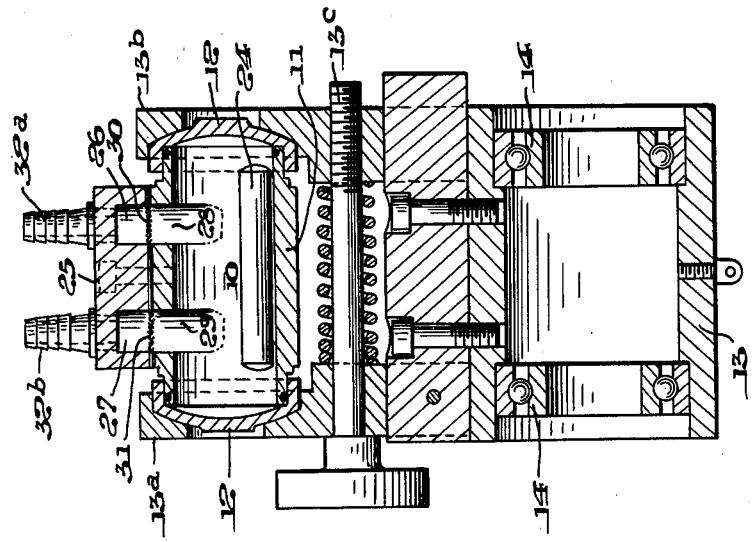
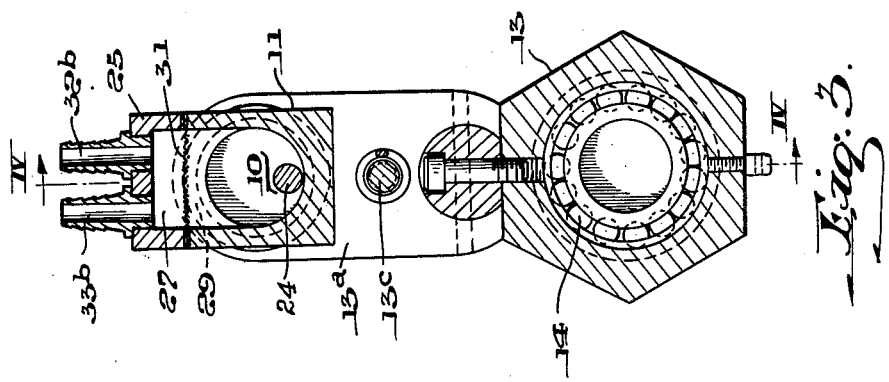

Jan. 26, 1965 A. H. PITCHFORD 3,167,259
METHOD AND APPARATUS FOR GRINDING AND/OR BLENDING
Filed March 8, 1961 5 Sheets-Sheet 3
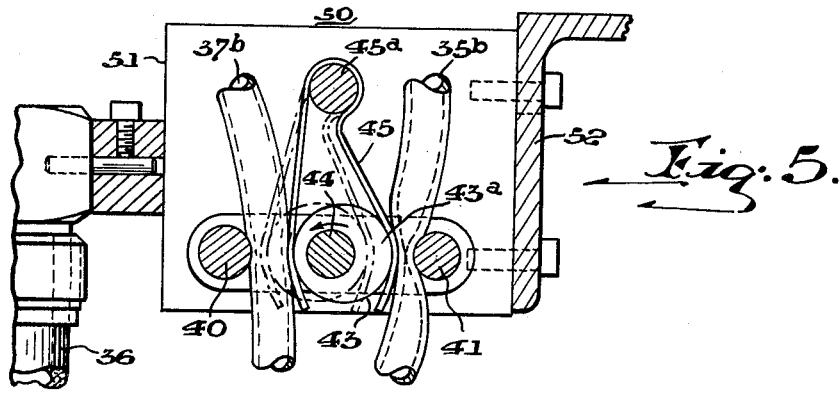
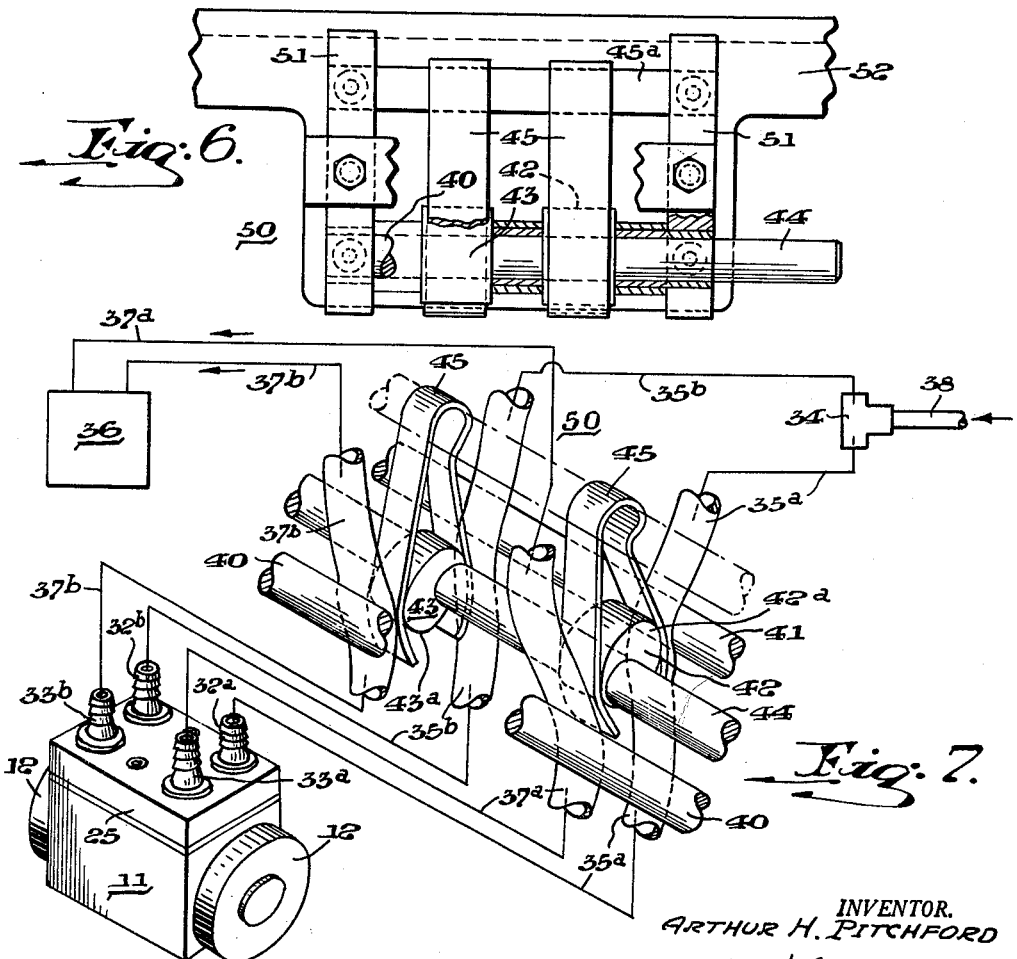
INVENTOR.
ARTHUR H. PITCHFORD
BY
his ATTORNEY.

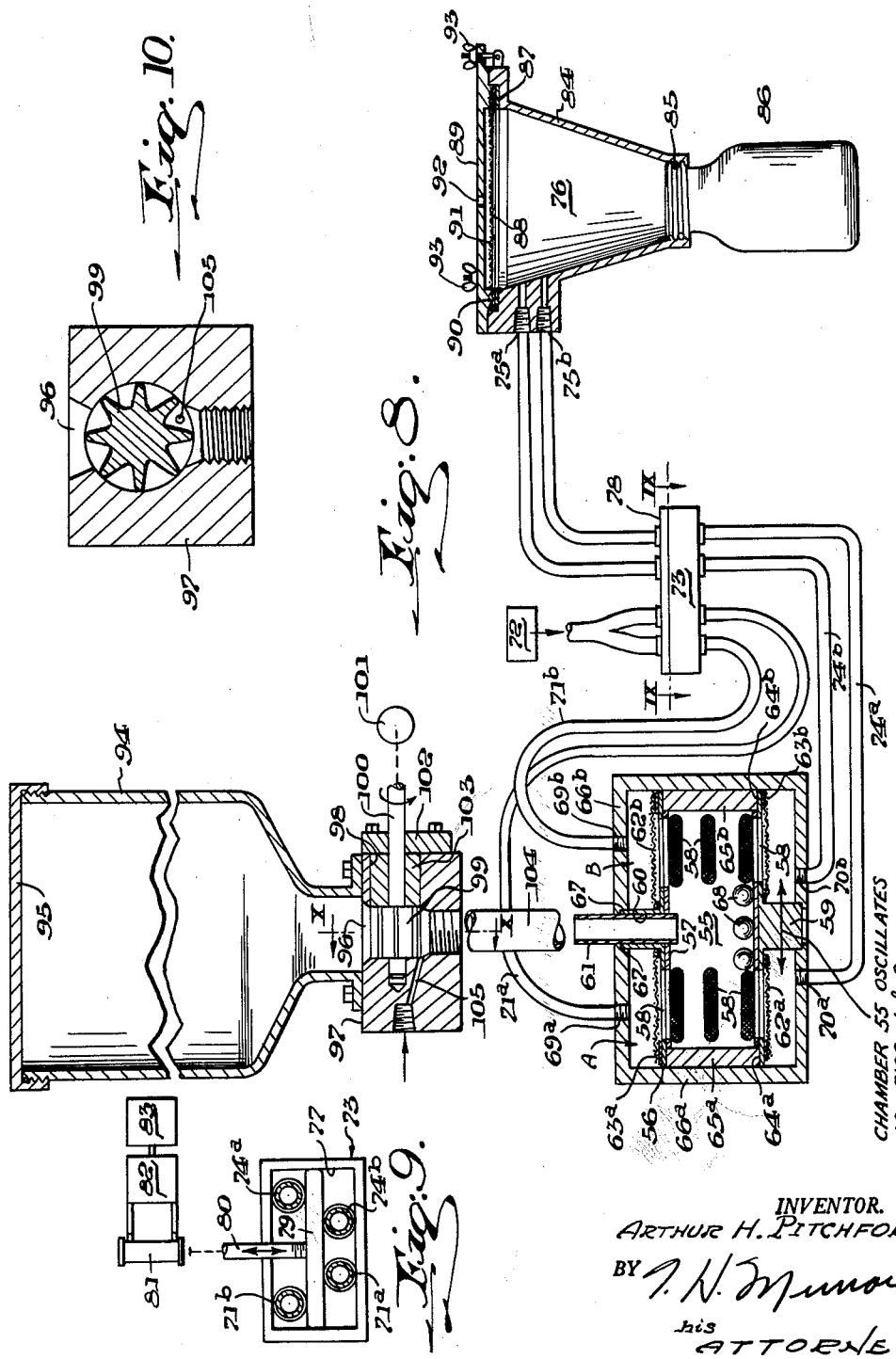

Jan. 26, 1965   A. H. PITCHFORD   3,167,259
METHOD AND APPARATUS FOR GRINDING AND/OR BLENDING
Filed March 8, 1961   5 Sheets-Sheet 5

INVENTOR.
ARTHUR H. PITCHFORD.
BY
his ATTORNEY

United States Patent Office 3,167,259
Patented Jan. 26, 1965

3,167,259
METHOD AND APPARATUS FOR GRINDING
AND/OR BLENDING
Arthur H. Pitchford, 501 Castle Shannon Blvd.,
Pittsburgh, Pa.
Filed Mar. 8, 1961, Ser. No. 94,308
16 Claims. (Cl. 241—19)

This invention relates to a method and apparatus for grinding and/or blending materials at high speed, and more particularly to a method and apparatus for batch or continuous grinding of materials to a selective and uniform particle size.

This application is a continuation-in-part of copending application Serial No. 789,813, filed January 29, 1959, now abandoned.

One of the major problems in the field of grinding is that of grinding to a substantially uniform particle size. Ordinary grinding techniques and apparatus such as a conventional ball mill will produce a wide range of particle sizes. For example, in the production of ground samples for chemical and spectroscopic analysis, and for a great variety of chemical materials, it is desirable to produce a material of generally uniform size. Experience has shown that conventional methods and techniques are of very low efficiency in producing the desired uniform particle size, usually in the order of twenty to twenty-five percent or less within a reasonable degree of uniformity. This requires particle size segregation after the grinding operation, which still does not assure uniformity of composition and, in the case of analytical samples, results in non-uniform and non-reproductible results.

To illustrate, in the grinding of powdered materials for X-ray spectroscopic analysis, some materials reduce easily to fine particle size while others present difficulties in grinding. One of the more acute problems occurs when both types of materials exist in the same sample to be analyzed. The easily-ground material is reduced not only by mulling and impact but by the attrition of the harder particles as well. As a result, the fine particles act as a cushion, inhibiting the reduction process of the hard particles. As the harder particles are ground down, the softer ones are simultaneously reduced to even finer size. Consequently, in such a sample, the fine particles present a greater density and area to the X-ray excitation source, and elements represented by these finer particles give greater intensities to the analyzing apparatus than they normally would if all particles in the sample were of the same size. Conversely, elements present in the larger particles will contribute lower intensities than normal. In the past, this has been a very serious problem in the analysis of powdered materials by the use of optical and X-ray emission spectrography, infra-red spectrography, petrography, X-ray diffraction, electron microscopy and other instrumental techniques, making it extremely difficult to achieve any reasonable degree of accuracy or uniformity in results.

Furthermore, in certain industrial grinding applications it is highly advantageous, as in laboratory work, to produce a uniform particle size. For example, in pulverizing coal it is desirable to produce a uniform particle size to effect a more complete and efficient combustion of the pulverized product. Such a uniform particle size, however, cannot be economically obtained with conventional pulverizing equipment heretofore used.

Aside from the uniformity of particle size required for certain applications, conventional grinding and/or blending techniques used in the industrial field require a large and bulky ball mill or other similar apparatus which can be continuously fed to obtain a reasonably good production output. Such ball mills, however, are relatively slow in operation; and although faster grinding and/or blending can be achieved in a rapidly oscillated grinding chamber such as that shown in U.S. Patent No. 778,510, no satisfactory means has heretofore been devised for continuously feeding and removing material from an oscillated chamber of this type, meaning that its use has been limited to the slower batch type operation where each batch must be loaded into the grinding chamber, ground and then removed before the next batch may be processed. This limitation has made the conventional oscillated grinding chamber unsatisfactory for industrial applications where high production rates are required.

As one object, the present invention seeks to provide a method and apparatus for selective grinding which will produce a product substantially uniform in both composition and particle size. The apparatus and method of the invention are capable to a degree not heretofore possible of removing particles once they have reached the desired size rather than permit them to remain in the grinding apparatus to be further reduced.

Another object of the invention is to provide grinding and/or blending apparatus which may be continuously fed and which will produce a continuous flow of ground and/or blended material at a rate much higher than that heretofore possible with conventional techniques.

Still another object of the invention is to provide a method and apparatus for continuous grinding and/or blending in an inert atmosphere.

In accordance with one aspect of the invention, there is provided a grinding and/or blending chamber which receives the material to be processed, spaced particle separating means in the chamber adapted to permit the passage of particles of a predetermined size, means for carrying particles in the chamber to and away from one and then the other of said spaced separating means, and collecting means for receiving particles passing through the particle separating means. Preferably, the spaced particle separating means are screens arranged at opposite ends or sides of the chamber. The means for carrying particles to and away from these spaced separating means is a fluid, preferably air, pulsed alternately into the grinding chamber through one screen and out through the other. In the pulsing cycle, air goes in through the screen at one end of the chamber, cleaning this screen on the way in; continues through the chamber and blasts the powder against the screen at the opposite end of the chamber; finally passing onto a collector. When powdered material is blown against a fine screen in this manner, even though the individual particles be the same or smaller than the screen size, the screen will blind or clog very rapidly and prevent any further material from passing therethrough. Consequently, in the present invention the air is alternately pulsed from one end of the grinding chamber to the other; and on the second pulse in the cycle, the air flow is reversed, thereby blasting powder against the previously cleaned screen while cleaning the screen against which powder was blasted by the previous pulse. In this manner a clean screen is always presented against which ground material is blasted. The collecting means may be a filter paper bag, a settlement chamber, a cyclone type centrifugal collector, an electrostatic precipitator, a screen or the like means for removing the sized particles from the fluid carrier passing through the spaced screens.

In cases where it is desired to blend two or more materials or grind material without particle size segregation, the screens at either end of the aforesaid chamber may be removed. Furthermore, the air pulsed alternately into the chamber may be produced by positive pressure on the inlet side or by a negative pressure on the outlet side. In either case, the speed of grinding and/or blending is greatly increased over conventional techniques. The material to be acted upon may be either fed into the chamber continuously or in batches, the continuous feed being adapted to produce a high production rate.

The above and other objects and features of the invention will become apparent from the following detailed description taken in connection with the accompanying drawings which form a part of this specification, and in which:

FIGURE 1 is a side elevation of one embodiment of the invention;

FIG. 2 is a front elevation of the embodiment of the invention shown in FIG. 1;

FIG. 3 is an enlarged section taken along line III—III of FIG. 2;

FIG. 4 is an enlarged section taken along line IV—IV of FIG. 3;

FIG. 5 is an enlarged detail of the pinch valve system used in the embodiment of FIG. 1;

FIG. 6 is a front elevation of the detail of FIG. 5 viewed from the left and having parts in section;

FIG. 7 is an isometric view, partly diagrammatical, of the flow of fluid and ground materials through the pinch valve system of the embodiment of FIG. 1;

FIG. 8 is a partly broken-away cross-sectional view of another embodiment of the invention adapted to continuously grind material;

FIG. 9 is a cross-sectional view taken along line IX—IX of FIG. 8 illustrating the pinch valve system used in the apparatus of FIG. 8;

FIG. 10 is a cross-sectional view taken along line X—X of FIG. 8 illustrating the vane-type continuous feeding apparatus of the embodiment of FIG. 8;

Figure 11:
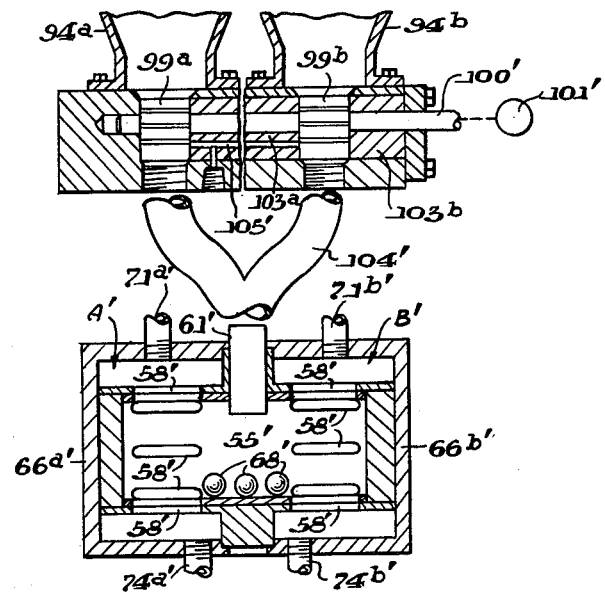
FIG. 11 illustrates an embodiment of the invention for continuously blending different materials.

Referring now to the drawings, and particularly FIGS. 1 to 4, there is illustrated a cylindrical grinding chamber 10 within a housing 11 closed by removable end caps 12 fixed in a holding frame 13. The end caps 12 are held between separable arms 13a and 13b by a screw 13c on frame 13. The frame 13 is provided with spaced journals 14 mounted for rotation on a shaft 15. The shaft 15 is an integral part of shaft 16 whose axis is askew to the axis of shaft 15, preferably at an angle of two to ten degrees. The shaft 16 is journaled in pillow blocks 17 and rotated therein by a motor 18 through variable pitch pulleys 19 and 20 and drive belt 21. A tension spring 22 enclosed within a protective resilient sheath 23 is fixed to the frame 13 and a base 13d of frame 13 to hold it against rotation on shaft 15. When shaft 16 is rotated, the ends of the axis of shaft 15 progress around the axis of shaft 16 causing the ends of housing 11 to move from right to left as viewed in FIG. 2 as well as following a path in a spherical segment roughly in the form of a figure eight. This causes the pestle 24 (FIG. 4) or its equivalent (i.e., grinding balls, etc.) to move from end-to-end and side-to-side, thereby causing a violent impact and mulling action.

As is best shown in FIGS. 3 and 4, a separator block 25 is mounted on top of housing 11. The separator block 25 is provided with spaced chambers or manifolds 26 and 27 at opposite ends thereof. Each of these chambers communicates with the chamber 10 through openings 28 and 29 through the walls of housing 11 in opposite ends thereof. Screens 30 and 31 are provided between each opening 28 and 29 and chambers 26 and 27. One of a pair of inlet nozzles 32a and 32b and one of a pair of outlet nozzles 33a and 33b are provided for each chamber 26 and 27. The nozzles 32a and 32b of each pair are connected to an air manifold 34 (FIG. 7) through flexible rubber tubes 35a and 35b; and the other nozzles 33a and 33b of each pair are connected to a collector 36 through flexible rubber tubes 37a and 37b. The air manifold 34 is connected to a source of filtered air under pressure (not shown) through line 38, while the collector 36 is of the well-known type comprising a tube or container of filter paper material which will permit a gas under pressure to pass therethrough while retaining the solid, ground material carried into the collector by the flow of fluid under pressure through tube 37a or 37b. Alternatively, the collector 36 may comprise a settling chamber, a cyclone separator, or any other similar collector, depending upon the particle size and other requirements for a particular application. A filter paper collector such as that shown in FIGS. 1 and 2 or a settling chamber, hereinafter described, is particularly suitable for ground materials of small particle size; whereas a cyclone separator is better adapted for use with ground particles which are larger and/or heavier.

The flexible plastic tubes 35a, 35b and 37a, 37b, are passed in pairs (one each of tubes 35a and 37a and 35b and 37b) through a pulsing mechanism 50 (FIGS. 5, 6 and 7) made up of side plates 51 mounted on a bracket 52 supported above base 13d by posts 53. Brackets 52 carry fixed rods 40 and 41 outside of each pair of tubes. A pair of spaced cams 42 and 43 with lobes 42a and 43a spaced 180° apart are mounted on shaft 44 journaled in side plates 51. One cam lies between each pair of tubes 35a, 37a and 35b, 37b. A protective spring 45 is suspended from keeper shaft 45a and lies over each cam between the cam and the paired tubes. The shaft 44 is rotated by motor 18 through pulleys 46 and 47 and belt 48. As the shaft rotates, one cam 42 opens air tube 35a at one chamber 26 while closing collector tube 37a at the same chamber; the other cam 43 simultaneously opens collector tube 37b and closes air tube 35b at the opposite chamber 27. This causes air to flow from chamber 26 at one end of separator block 25, through screen 30 and opening 28 into the housing and across the grinding chamber 10 to exit through opening 29, screen 31 and chamber 27 at the opposite end of separator block 25. The air thereby cleans screen 30 and carries particles which are still to be ground into grinding chamber 10. At the same time, it extracts through screen 31 the particles which have been reduced to a size which will pass screen 31. When the cams are rotated through 180°, the air tube 35a is closed while collector tube 37a is opened and air tube 35b is opened while collector tube 37b is closed, thereby causing the flow of air through grinding chamber 10 to be reversed, to clean screen 31 and carry reduced particles through screen 30. This pulsation of air through the grinding chamber in alternate directions agitates the material to be ground and prevents its collection in the ends of the grinding chamber while at the same time cleaning one screen as it carries sized particles through the opposite screen.

The pulleys 19 and 20 are made variable in order that the speed of grinding may be regulated to be slightly less than the ability of the screens and air to carry sized particles out of the grinding chamber 10. In the operation of the device, the screw 13c will be rotated to separate the arms 13a and 13b and permit the grinding chamber 10 to be removed therefrom. Thereafter, one of the end caps 12 will be removed from the cylindrical housing 11 and a batch of material to be ground inserted therein. Following this, the end cap 12 will be placed on the housing 11, and the grinding chamber clamped between the arms 13a and 13b. At this point, the motor 18 is started and grinding progresses with the air being pulsed alternately into opposite ends of the chamber to carry the ground material to the collector 36 through tubes 37a and 37b. In this process, as soon as the ground material reaches a particle size permitting it to pass through the screens 30 and 31, it will pass out of the grinding chamber 10 to the collector 36 and will not remain in the chamber to be further reduced in size as was the case with prior art grinders of this type. Initially, the softer materials which are ground more readily will pass out through the screens 30 and 31, followed by the harder materials which require a longer period of time to grind down to the required size.

In FIGS. 8, 9 and 10, another embodiment of the invention is shown which may be used to continuously grind materials to a uniform particle size. In this embodiment, the grinding chamber 55 will be held between clamps or arms, not shown, similar to arms 13a and 13b in FIGS. 1–4 and oscillated such that it will move axially back and forth as well as following a path in a spherical segment roughly in the form of a figure eight. The grinding chamber 55 comprises a cylindrical vial 56 having a cooperating cylindrical vial insert 57 carried on its inner periphery. As shown, the vial 56 and insert 57 are each provided with registering elongated slots 58 at their opposite ends. Integral with the vial 56 is a circumferentially extending flange 59 having a radially-extending opening 60 therein which receives a tube 61, the purpose of this tube being to convey materials to be ground into the chamber 55. Surrounding the opposite ends of the vial 56 and covering the elongated openings 58 are two cylindrical screens 62a and 62b which are carried on screen frames 63a and 63b and fitted over the outer peripheral surface of the vial between opposite sides of flange 59 and the ends of the vial. As will be understood, the screens 62a and 62b correspond to, and serve the same function as, the screens 30 and 31 of FIGS. 1–4.

It will be noted that the vial insert 57 has an axial length shorter than that of the vial 56 itself, thereby providing annular seats 64a and 64b which receive disc-shaped end plates 65a and 65b. Fitted over the ends of the grinding chamber 55 are cup-shaped housing sections 66a and 66b which have diameters approximating that of the outside diameter of flange 59. The edges of the sections 66a and 66b are provided with annular seats 67, the arrangement being such that the two sections are held against the flange 59 by clamps or arms similar to the arms 13a and 13b shown in FIGS. 1–4. When the sections 66a and 66b are thus clamped in position, they will also hold the end caps 65a and 65b in position against the opposite ends of the vial insert 57 while forming air manifolds A and B at the opposite ends of the vial. To effect the grinding operation, balls 68 are deposited within the grinding chamber, and these balls serve the same function as the pestle 24 shown in FIG. 4.

Extending through the walls of the housing sections 66a and 66b to manifolds A and B are two inlet ports 69a and 69b as well as two outlet ports 70a and 70b. Inlet ports 69a and 69b are connected through flexible plastic tubes 71a and 71b to a source of fluid under pressure, generally indicated at 72. Between the ports 69a and 69b and the fluid pressure source 72 is a pulsing mechanism 73, hereinafter described in detail, which, like the cams 42 and 43 of FIGS. 1–7, serves to alternately admit fluid under pressure into tubes 71a and 71b. In a similar manner, the outlet ports 70a and 70b are connected through flexible plastic tubes 74a and 74b, respectively, and the pulsing mechanism 73 to the inlet ports 75a and 75b of a filtering or settling chamber 76.

As shown in FIG. 9, the pulsing mechanism 73, in its simplest form, comprises a block having a generally rectangular cavity 77 formed therein and adapted to receive a cover plate 78 (FIG. 8). Reciprocable within the cavity 77 is a bar 79 which is connected through rod 80 to an air cylinder, schematically illustrated at 81. Formed in the cover plate 78 and the bottom of cavity 77 are axially aligned holes through which pass the flexible tubes 71a, 71b, 74a and 74b. It will be noted that the tubes 71b and 74a are on one side of the reciprocating bar 79; whereas the tubes 71a and 74b are on the other side of the bar. The air cylinder 81 is connected through valving, schematically illustrated at 82, to a source of fluid under pressure 83 which may be the same source as source 72 shown in FIG. 8, if desired. The valving mechanism 82 is such as to cause the air cylinder 81 to reciprocate its piston, not shown, back and forth at high speed, thereby reciprocating the bar 79 also. As the bar 79 moves downwardly as shown in FIG. 9, it will pinch and close off tubes 71a and 74b. Under these circumstances, fluid under pressure will flow from source 72 through tube 71b to the air manifold B formed between housing section 66b and the right end of vial 56. From manifold B, the air flows through screen 62b and into chamber 55 through openings 58, thereby cleaning the screen 62b. In this process, the air is forced out of chamber 55 through screen 62a at the opposite end of the chamber, and this air carries with it ground material, which is of a size to pass through the screen 62a, into manifold A and tube 74a where it is conducted to the settling chamber 76. On the next cycle of air cylinder 81, then, the bar 79 moves upwardly, thereby pinching tubes 71b and 74a and closing them off while permitting air from source 72 to flow through tube 71a into the annular manifold A formed by housing section 66a at the left end of chamber 55. On this half of the cycle, the powder which was blasted against the screen 62a is forced back into the grinding chamber while the ground material of a size to pass through screen 62b flows through this screen which was previously cleaned on the preceding pulse and into manifold B and tube 74b where it is conducted to the settling chamber 76.

As will be understood, the air in tubes 71a and 71b is pulsed at a very high rate of speed to constantly reverse the air flow through chamber 55 during the grinding operation to clean one of the screens 62a or 62b while simultaneously blasting powder against the other screen. Due to the high speed of operation, particles of a size to pass through either one of the screens 62a or 62b are removed from chamber 55 as soon as they reach that size and are not permitted to remain in the chamber to be further reduced, the result being that the particles removed from the chamber will be generally of the same size.

The settling chamber 76, in this case, comprises a funnel-shaped housing 84 having a threaded insert 85 fitted into its lower end. The insert 85, in turn, receives a glass bottle 86 or any other suitable receptacle for receiving the ground material after it passes into chamber 76. The upper edge of the housing 84 is provided with an annular seat which receives a gasket 87. Positioned on the gasket 87 is a removable disc 88 of filter paper which serves to permit the air under pressure to pass therethrough while retaining the ground material within chamber 76 in order that it may fall into receptacle 86. The chamber 76 is closed by means of a circular cover 89 provided with an annular flange 90 which carries, at its bottom surface, a screen 91, the purpose of the screen being to give support to the filter paper 88. Provided in the cover 89 is an opening 92 which permits the air under pressure to pass to the atmosphere after passing through the filter paper 88. The cover 89 is secured to the housing 76, as shown, by means of a plurality of wing nuts 93.

Although the material to be ground may be placed in the grinding chamber 55 in batches, it may also be fed therein continuously, thereby producing a continuous flow of ground material to the settling chamber 76. Apparatus for effecting a continuous feed is shown in FIG. 8 and comprises a storage bin 94 having a removable upper cap 95. The lower end of the storage bin 94 is funnel-shaped as shown and communicates with an opening 96 in a block 97. Intersecting the opening 96 in block 97 is a bore 98 which receives a vane-type feeder 99, possibly best shown in FIG. 9, which is rotatably driven through shaft 100 by means of an electric motor 101 or other suitable source of motive power. Between the feeder 99 and an end plate 102 on the block 97 is a cylindrical spacer 103. With the arrangement shown, the material to be ground in bin 94 will be conveyed by feeder 99 to a flexible plastic or other similar tube 104 which leads to tube 61, this latter tube being inserted in opening 60 provided in annular flange 59 as was previously explained.

Under ordinary circumstances, material to be ground, after being fed into tube 104 by feeder 99, will not readily fall into the grinding chamber 55 due to the back pressure therein and possibly due to the tendency of the material to cling to the sides of the tube 104. Accordingly, means are provided for gently forcing the material to be ground into the chamber 55, and this means comprises a passageway 105 which serves to conduct air under pressure into the lower half of bore 98 where it will force the material carried by the feeder 99 into the chamber 55.

In FIG. 11, another embodiment of the invention is shown for grinding and/or blending two materials without particle size segregation. In this case, two storage bins 94a and 94b are provided together with two vane-type feeders 99a and 99b connected to a common shaft 100′ driven by a motor 101′. Cylindrical spacers 103a and 103b serve to hold the feeders 99a and 99b in place. Air under pressure is admitted to passage 105′ formed in spacer 103a; and this air, like that in passage 105 of FIG. 8 serves to force the materials to be blended through tube 104′, it being understood that this tube is connected to the outputs of each of the feeders 99a and 99b.

From tube 104′ the two materials to be blended are passed to a chamber 55′ which is similar in construction to grinding chamber 55. Accordingly, elements in FIG. 11 which correspond to elements shown in FIG. 8 are identified by the same primed reference numerals. The chamber 55′ is oscillated in the same manner as the chamber 55 for grinding, although this is not necessary for blending. It will be noted, however, that in the embodiment of FIG. 11 the screens covering the openings 58′ are eliminated. Thus, no particle size segregation will occur, however, the two materials will be blended and passed to output ports 70a′ and 70b′ as in the embodiment of FIG. 8 where they will be passed through a pulsing mechanism to a settlement chamber or other similar collecting means.

In the embodiment of FIG. 11, the two materials to be ground and blended will mix in equal proportions. If, however, it is desired to blend the two materials in different proportions, the sizes of the feeders 99a and 99b may be varied or the two feeders driven from separate shafts at different speeds to effect the proper mixture. Furthermore, if desired, the grinding balls may be eliminated from the chamber 55′ to effect only a blending operation and, in addition, screens may be employed over the openings 58′ to achieve particle size segregation if desired.

Figure 12:
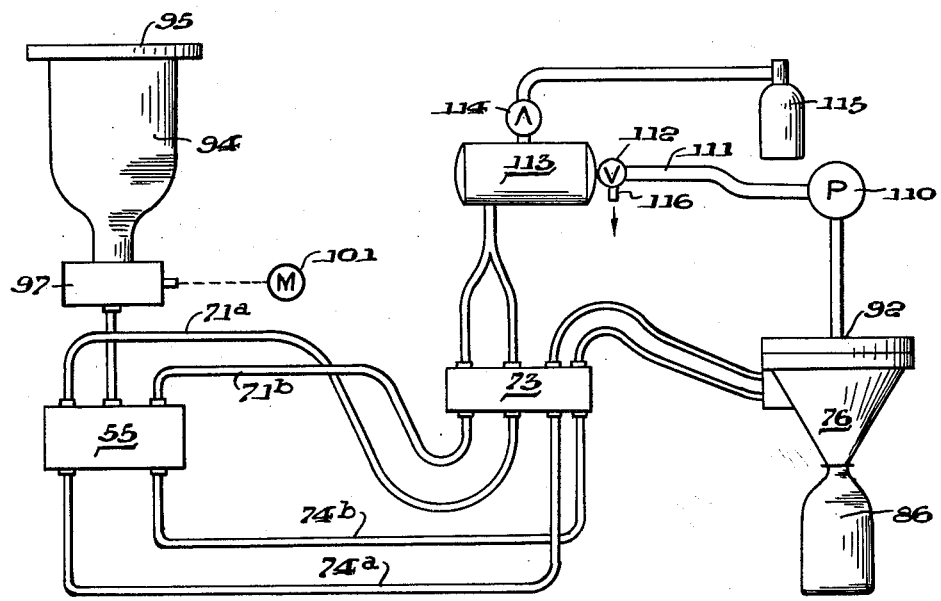
FIG. 12 is a diagrammatic showing of an embodiment of the invention wherein a negative, rather than positive, pressure is employed to remove ground particles from a grinding chamber under the influence of an inert atmosphere.

In FIG. 12 still another embodiment of the invention is shown wherein the grinding and/or blending is carried out under the influence of an inert atmosphere and a negative, rather than positive, pressure is employed to alternately blast powder against one of the screens in the grinding chamber while simultaneously cleaning the other screen. In the embodiment of FIG. 12, elements which correspond to those in FIG. 8 are identified by like reference numerals. In this case, however, a pump 110 is connected to the opening 92 in settling chamber 76 to create a vacuum or negative pressure in tubes 74a and 74b which serves to "suck" the powdered material out of the grinding chamber 55. The output side of pump 110 is connected through tube 111 and valve 112 to a storage tank 113 which, in turn, is connected to tubes 71a and 71b as shown. The storage tank 113 is also connected through a check valve 114 to a tank 115 containing inert gas.

In order to bleed the system of air, the valve 112 will connect tube 111 to tube 116 whereby all of the air in the system will be evacuated while the inert gas from tank 115 will flow into tank 113 and the remainder of the system through check valve 114. When the system is thus evacuated, valve 112 will be adjusted to connect tube 111 to tank 113 while disconnecting it from tube 116 whereby there will be a continuous flow of inert gas through the system. In order to maintain the supply of inert gas in the system, the check valve 114 will open whenever the pressure within tank 113 drops below a predetermined value to permit additional gas to flow into the system from tank 115. The operation of the system in this case is the same as that previously described except that a negative, rather than positive, pressure is used to pulse the material back and forth in the grinding chamber 55 and cause it to alternately flow through the screens 62a and 62b.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An apparatus for selective grinding comprising a grinding chamber, grinding means in the chamber, means for moving the grinding means within the chamber, spaced screen means at opposite ends of said chamber adapted to pass particles of a predetermined size, fluid inlet and outlet means at each of said screens, means acting on said inlet and outlet means to alternately open the inlet means and close the outlet means at one screen while opening the outlet means and closing the inlet means at the other screen whereby fluid may be pulsed in alternate directions through the screen means and grinding chamber, a source of fluid under pressure connected to said inlet means, and collecting means connected to said outlet means and adapted to receive material therefrom.

2. An apparatus for selective grinding comprising a grinding chamber, grinding means in the chamber, means for moving the grinding means within the chamber, said grinding chamber having openings at opposite ends thereof, a separating chamber communicating with each opening, a screen between each opening and the corresponding separating chamber, fluid inlet and outlet means communicating with each separating chamber, means acting on said inlet and outlet means to alternately open the inlet means and close the outlet means at one chamber while simultaneously opening the outlet means and closing the inlet means at the other separating chamber whereby fluid may be pulsed in alternate directions through the screen means and grinding chamber, a source of fluid under pressure connected to said inlet means, and collecting means connected to said outlet means adapted to receive sized material therefrom.

3. An apparatus for grinding comprising a chamber for fracturing particles to be reduced, means in the chamber for fracturing particles, means for moving the fracturing means within the chamber, spaced screens in the chamber walls adapted to pass particles of a predetermined size, means connected to the chamber for alternately forcing fluid into said chamber through one and then the other of said screens to reverse the flow of fluid in the chamber and alternately carry particles in said chamber to one and then the other of said screens, and collecting means receiving material passing through said screens.

4. In combination, an enclosed particle-receiving chamber, spaced particle separating means in the chamber walls adapted to pass particles of a predetermined size, pulsing means connected to the chamber for alternately causing fluid to flow into said chamber through one and then the other of said particle separating means to reverse the flow of fluid in the chamber and alternately carry particles in said chamber to one and then the other of said particle separating means, and collecting means receiving material passing through said particle separating means.

5. In combination, an enclosed particle-receiving chamber, a pair of manifolds connected to said chamber at spaced points, particle separating means interposed between each manifold and the chamber, pulsing means for alternately creating a fluid pressure in one of said manifolds which is higher than that in the other manifold to reverse the flow of fluid in the chamber and alternately cause particles in the chamber to move against one and then the other of said particle separating means, and collecting means receiving material passing through said particle separating means.

6. In combination, a particle-receiving chamber, a pair of manifolds communicating with said chamber at spaced points, screen means interposed between each manifold and the chamber, fluid inlet and outlet means for each of said manifolds, and pulsing means acting on said inlet and outlet means to alternately open the inlet means and close the outlet means at one manifold while opening the outlet means and closing the inlet means at the other manifold whereby fluid may be pulsed in alternate directions through the screen means and reversed in the chamber to alternately carry particles against one and then the other of said screen means.

7. In combination, an enclosed particle-receiving chamber, pulsing means connected to the chamber for alternately forcing fluid into one and then the other end of said chamber to reverse the flow of fluid in the chamber and alternately carry particles to one and then the other end of said chamber and thoroughly mix the same, and means at opposite ends of said chamber for removing at least a portion of said particles from the chamber each time they are carried to an end of the chamber.

8. In combination, a particle-receiving chamber, first and second openings at either end of said chamber, and means for alternately forcing fluid into the first of said openings at one and then the other end of said chamber while simultaneously removing particles from the second of said openings at one and then the other end of the chamber opposite that into which fluid is forced, the arrangement being such that a violent turbulence will be created within said chamber to thoroughly blend the particles therein while at least a portion of said particles are removed from the second opening at one end of the chamber each time fluid under pressure is forced through the first opening at the other end of the chamber.

9. In combination, a particle-receiving chamber, a pair of fluid inlet conduits connected to either end of said chamber, a pair of fluid outlet conduits connected to either end of said chamber, and valve means for alternately opening and then closing the conduit in said inlet pair at one end of the chamber while reversely closing and then opening the conduit in said inlet pair at the other end of the chamber, said valve means also serving to alternately open the conduit in said outlet pair at the end of the chamber adjacent the closed conduit in said inlet pair while closing the other conduit in the outlet pair, the arrangement being such that fluid will alternately flow from an open conduit in the inlet pair at one end of the chamber to an open conduit in the outlet pair at the other end of the chamber to carry at least a portion of the particles out of the chamber while creating turbulence within the chamber to thoroughly mix the particles contained therein.

10. An apparatus for grinding comprising a chamber for fracturing particles to be reduced, means in the chamber for fracturing particles, means for oscillating the chamber, spaced screen in the chamber adapted to pass particles of a predetermined size, a first pair of conduits each of which is adapted to convey fluid under pressure into said chamber through an associated one of said screens, a second pair of conduits each of which is adapted to carry particles out of said chamber which pass through an associated one of said screens, and valve means for alternately opening and then closing the conduit in said first pair associated with one of said screens while reversely closing and then opening the conduit in said first pair associated with the other of said screen, said valve means also serving to alternately open the conduit in said second pair associated with the one of said screens through which particles are passing while closing the other conduit in said second pair.

11. An apparatus for continuously grinding particles comprising a chamber for fracturing particles to be reduced, means in the chamber for fracturing particles, means for oscillating the chamber, apparatus for continuously feeding particles to be reduced into said chamber, spaced particle separating means in the chamber walls adapted to pass particles of a predetermined size, means for alternately forcing fluid under pressure into said chamber through one and then the other of said particle separating means to reverse the flow of fluid in the chamber and alternately carry particles in said chamber to one and then other of said particle separating means, and collecting means receiving material passing through said particle separating means.

12. An apparatus for continuously grinding particles comprising a chamber for fracturing particles to be reduced, means in the chamber for fracturing particles, means for oscillating the chamber to move the fracturing means within the chamber, a storage bin for particles to be reduced, means for conveying particles from said storage bin to said chamber under pressure, spaced screens in the chamber walls adapted to pass particles of a predetermined size, means for alternately forcing fluid under pressure into said chamber through one and then the other of said screens to reverse the flow of fluid in the chamber and alternately carry particles in said chamber to one and then the other of said screens, and collecting means receiving material passing through said screens.

13. An apparatus for continuously blending particles from a plurality of storage bins comprising a blending chamber, means for continuously feeding particles from said bins to said chamber, means for alternately forcing fluid under pressure into one and then the other end of said chamber to reverse the flow of fluid in the chamber and alternately blast particles against one and then the other end of said chamber while thoroughly blending the same, and means at opposite ends of said chamber for removing at least a portion of said particles from the chamber each time they are blasted against an end of the chamber.

14. In combination, an enclosed particle-receiving chamber, means for introducing particles into the chamber, spaced screen means at opposite ends of said chamber adapted to pass particles of a predetermined size, fluid inlet and outlet means at each of said screens, means acting on said inlet and outlet means to alternately open the inlet means and close the outlet means at one screen while opening the outlet means and closing the inlet means at the other screen whereby fluid may be pulsed in opposite directions through the screen means and the flow of fluid and the particles reversed in the chamber, a source of inert gas connected to the inlet means, pump means connected to said outlet means to create a pressure in the outlet means which is lower than that of said source of inert gas whereby the inert gas will alternately flow back and forth through the screen means and chamber to the outlet means, and particle collecting means in the outlet means between said pump means and said chamber.

15. A method for selective grinding comprising the steps of introducing particles to be reduced into an enclosed chamber, moving fracturing means within the chamber to reduce the particles, carrying the particles in a single reversing fluid media alternately to one and then the other of a pair of spaced particle separating means at opposite ends of the chamber through which the fluid media passes, and collecting the particles passing through said particle separating means.

16. A method for separating particles below a predetermined size from particles above said predetermined size comprising the steps of introducing the particles into an enclosed chamber, carrying the particles in a reversing single fluid media alternately to one and then the other of a pair of spaced particle separating means at opposite ends of the chamber through which the fluid media passes, and collecting the particles passing through said particle separating means.

References Cited in the file of this patent

UNITED STATES PATENTS

| | | |
|---|---|---|
| 153,172 | Kirk et al. | July 21, 1874 |
| 215,690 | Swift et al. | May 20, 1879 |
| 223,818 | Russell | Jan. 27, 1880 |
| 298,904 | Sheppard | May 20, 1884 |
| 339,723 | Winkler | Apr. 13, 1886 |
| 433,034 | Reitz | July 29, 1890 |
| 1,385,674 | Fraser | July 26, 1921 |
| 1,624,518 | Stebbins | Apr. 12, 1927 |
| 1,831,625 | Hardinge | Nov. 10, 1931 |
| 1,834,917 | Gilchrist | Dec. 1, 1931 |
| 2,205,525 | Goebels | June 25, 1940 |
| 2,526,355 | Hesse | Oct. 17, 1950 |
| 2,566,127 | Fuhrman | Aug. 28, 1951 |
| 2,595,117 | Ahlmann | Apr. 29, 1952 |
| 2,764,359 | Szegvari | Sept. 25, 1956 |
| 2,766,939 | Weston | Oct. 16, 1956 |
| 2,996,183 | Russum | Aug. 15, 1961 |

FOREIGN PATENTS

| | | |
|---|---|---|
| 344,227 | Great Britain | Mar. 5, 1931 |